(12) United States Patent
Waldspurger et al.

(10) Patent No.: US 11,899,572 B2
(45) Date of Patent: Feb. 13, 2024

(54) SYSTEMS AND METHODS FOR TRANSPARENT SWAP-SPACE VIRTUALIZATION

(71) Applicant: Nutanix, Inc., San Jose, CA (US)

(72) Inventors: Carl Alan Waldspurger, Palo Alto, CA (US); Florian Anselm Johannes Schmidt, Cambridge (GB); Jonathan James Davies, Cambridge (GB); Ivan Teterevkov, Ely (GB); Christopher Joel Riches, Cambridge (GB)

(73) Assignee: Nutanix, Inc., San Jose, CA (US)

( * ) Notice: Subject to any disclaimer, the term of this patent is extended or adjusted under 35 U.S.C. 154(b) by 197 days.

(21) Appl. No.: 17/470,685

(22) Filed: Sep. 9, 2021

(65) Prior Publication Data

US 2023/0071475 A1 Mar. 9, 2023

(51) Int. Cl.
*G06F 12/02* (2006.01)
*G06F 9/455* (2018.01)
*G06F 9/48* (2006.01)

(52) U.S. Cl.
CPC ...... *G06F 12/0223* (2013.01); *G06F 9/45558* (2013.01); *G06F 9/4856* (2013.01); *G06F 2009/4557* (2013.01); *G06F 2009/45583* (2013.01); *G06F 2212/657* (2013.01)

(58) Field of Classification Search
CPC ............. G06F 12/0223; G06F 9/45558; G06F 9/4856; G06F 2009/4557; G06F 2009/45583; G06F 2212/657; G06F 16/10
See application file for complete search history.

(56) References Cited

U.S. PATENT DOCUMENTS

| | | |
|---|---|---|
| 5,802,309 A | 9/1998 | Cook et al. |
| 6,209,128 B1 | 3/2001 | Gerard et al. |
| 6,775,673 B2 | 8/2004 | Mahalingam et al. |
| 7,395,279 B2 | 7/2008 | Iyengar et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |
| 7,721,044 B1 | 5/2010 | Chatterjee et al. |

(Continued)

FOREIGN PATENT DOCUMENTS

EP  4 006 737 A1  6/2022

OTHER PUBLICATIONS

"Adding Objects to Versioning—Enabled Buckets", from https://docs.aws.amazon.com/AmazonS3/latest/dev/AddingObjectstoVersioningEnabledBuckets.html, (Oct. 2, 2019).

(Continued)

*Primary Examiner* — Michael Krofcheck
(74) *Attorney, Agent, or Firm* — Foley & Lardner LLP

(57) ABSTRACT

In some aspects, a non-transitory computer readable storage medium includes instructions stored thereon that, when executed by a processor, cause the processor to create a virtual swap space that is exposed to a core system software, intercept a first page selected by the core system software to be swapped out to the virtual swap space, map the virtual swap space to a physical swap space that is allocated to a type of page associated with first swap metadata, and write the first page to the physical swap space based on the first page having the first swap metadata. In some embodiments, the first page is associated with the first swap metadata.

17 Claims, 8 Drawing Sheets

(56) References Cited

U.S. PATENT DOCUMENTS

| | | |
|---|---|---|
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,312,027 B2 | 11/2012 | Lamb et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,120,902 B2 | 11/2018 | Erdogan et al. |
| 10,152,428 B1* | 12/2018 | Alshawabkeh ..... G06F 12/1009 |
| 10,176,225 B2 | 1/2019 | Naidu et al. |
| 10,296,255 B1 | 5/2019 | Tummala |
| 10,380,078 B1 | 8/2019 | Kumar et al. |
| 10,409,837 B1 | 9/2019 | Schmidt et al. |
| 10,528,262 B1 | 1/2020 | Shmuylovich et al. |
| 10,565,230 B2 | 2/2020 | Zheng et al. |
| 10,592,495 B1 | 3/2020 | Shami et al. |
| 10,691,464 B1 | 6/2020 | Drego et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 11,099,938 B2 | 8/2021 | Desai et al. |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2003/0145310 A1 | 7/2003 | Thames et al. |
| 2003/0172094 A1 | 9/2003 | Lauria et al. |
| 2003/0191745 A1 | 10/2003 | Jiang et al. |
| 2004/0186826 A1 | 9/2004 | Choi et al. |
| 2005/0273571 A1* | 12/2005 | Lyon ................ G06F 9/45537 |
| | | 711/203 |
| 2006/0041661 A1 | 2/2006 | Erickson et al. |
| 2006/0047636 A1 | 3/2006 | Mohania et al. |
| 2006/0080646 A1 | 4/2006 | Aman |
| 2006/0161704 A1 | 7/2006 | Nystad et al. |
| 2007/0088744 A1 | 4/2007 | Webber et al. |
| 2008/0034307 A1 | 2/2008 | Cisler et al. |
| 2009/0327621 A1* | 12/2009 | Kliot ................ G06F 12/0253 |
| | | 711/E12.002 |
| 2010/0042673 A1 | 2/2010 | Dayley |
| 2011/0082962 A1 | 4/2011 | Horovitz et al. |
| 2011/0137966 A1 | 6/2011 | Srinivasan et al. |
| 2011/0185355 A1 | 7/2011 | Chawla et al. |
| 2011/0213884 A1 | 9/2011 | Ferris et al. |
| 2012/0096052 A1 | 4/2012 | Tolia et al. |
| 2012/0096205 A1 | 4/2012 | Velayudhan et al. |
| 2012/0210095 A1* | 8/2012 | Nellans .............. G06F 12/1072 |
| | | 711/E12.059 |
| 2012/0331065 A1 | 12/2012 | Aho et al. |
| 2012/0331243 A1 | 12/2012 | Aho et al. |
| 2013/0054523 A1 | 2/2013 | Anglin et al. |
| 2013/0103884 A1* | 4/2013 | Cho .................... G06F 12/0246 |
| | | 711/E12.007 |
| 2013/0198472 A1 | 8/2013 | Fang et al. |
| 2013/0246431 A1 | 9/2013 | Ahuja et al. |
| 2013/0332608 A1 | 12/2013 | Shiga et al. |
| 2014/0173227 A1* | 6/2014 | Min ........................ G06F 12/08 |
| | | 711/159 |
| 2014/0279838 A1 | 9/2014 | Tsirogiannis et al. |
| 2014/0379840 A1 | 12/2014 | Dao |
| 2015/0012571 A1 | 1/2015 | Powell et al. |
| 2015/0046586 A1 | 2/2015 | Zhang et al. |
| 2015/0046600 A1 | 2/2015 | Kim |
| 2015/0254325 A1 | 9/2015 | Stringham |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0117226 A1 | 4/2016 | Hetrick et al. |
| 2016/0162547 A1 | 6/2016 | Morris |
| 2016/0207673 A1 | 7/2016 | Shlonsky et al. |
| 2016/0275125 A1 | 9/2016 | Drobychev et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0207929 A1 | 7/2019 | Koorapati et al. |
| 2019/0213175 A1 | 7/2019 | Kong et al. |
| 2019/0213179 A1 | 7/2019 | Mchugh et al. |
| 2019/0227713 A1 | 7/2019 | Parthasarathy |
| 2019/0243547 A1 | 8/2019 | Duggal et al. |
| 2019/0286465 A1* | 9/2019 | Cui ...................... G06F 9/45533 |
| 2019/0324874 A1 | 10/2019 | Gill et al. |
| 2019/0354544 A1 | 11/2019 | Hertz et al. |
| 2019/0370043 A1* | 12/2019 | Olderdissen .......... G06F 3/0604 |
| 2019/0370362 A1 | 12/2019 | Mainali et al. |
| 2019/0384678 A1 | 12/2019 | Samprathi et al. |
| 2019/0391843 A1* | 12/2019 | Franciosi ............ G06F 12/1072 |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |
| 2020/0195743 A1 | 6/2020 | Jiang et al. |
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0072917 A1 | 3/2021 | Surla et al. |
| 2021/0124651 A1 | 4/2021 | Srinivasan et al. |
| 2021/0181962 A1 | 6/2021 | Dai et al. |

(56) References Cited

U.S. PATENT DOCUMENTS

2021/0294499 A1 9/2021 Wang et al.
2021/0406224 A1 12/2021 Neufeld et al.

OTHER PUBLICATIONS

"AWS Pricing"; Amazon Web Services; https://aws.amazon.com/pricing/; Webpage accessed on Jun. 23, 2021; pp. 1-9.
"Cloud & Hosting Services'Building a Cloud Infrastructure"; NetApp; https://www.netapp.com/hybrid-cloud/service-provider-infrastructure/; webpage accessed on Jun. 23, 2021; pp. 1-11.
"Configure a Pod to Use a ConfigMap", from https://kubernetes.io/docs/tasks/configure-pod-container/configure-pod-configmap/,(Oct. 2, 2019).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"Deployments", from https://kubernetes.io/docs/concepts/workloads/controllers/deployment/,(Oct. 2, 2019).
"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.
"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
"Volumes", from https://kubernetes.io/docs/concepts/storage/volumes/, (Oct. 2, 2019).
AWS Storage Gateway "Creating an NFS file share" (Oct. 28, 2020) from https://docs.aws.amazon.com/storagegateway/latest/userguide/CreatingAnNFSFileShare.html, pp. 1-10.
B Tree Indexes. http://web.csulb.edu/-amonge/classes/common/db/B TreeIndexes.html, Aug. 4, 2018, pp. 1-7 (2018).
Cano, Ignacio, et al. "Curator: Self-Managing Storage for Enterprise Clusters" (Mar. 27, 2017), from https://www.usenix.org/conference/nsdi17/.
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose "A guide on how to Mount Amazon S3 as a Drive for Cloud File Sharing" (Jun. 17, 2020) from https://www.nakivo.com/blog/mount-amazon-s3-as-a-drive-how-to-guide, pp. 1-27.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.
Object Storage—Gluster Docs, "SwiftOnFile" (Oct. 28, 2020) from https://staged-gluster-docs.readthedocs.io/en/release3.7.0beta1/Administrator%20Guide/Object%20Storage, pp. 1-2.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Stopford. Log Structured Merge Trees. http://www.benstopford.com/2015/02/14/ log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
"Choosing a load balancer for your object storage environment", NetApp 2020.
"NetApp StorageGRID", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.

(56) References Cited

OTHER PUBLICATIONS

Cloudian, "Simple, Secure, Scalable. S3-Compatible, Cloud Native Data Management", https://cloudian.com/products/hyperstore/, accessed Dec. 12, 2022.
Final Office Action on U.S. Appl. No. 17/150,081 dated Feb. 10, 2023.
Final Office Action on U.S. Appl. No. 17/358,967 dated Feb. 22, 2023.
Netapp, "StorageGRID: Smart, fast, future-proof object storage", https://www.netapp.com/data-storage/storagegrid/, accessed Dec. 12, 2022.
OpenStack. Openstack Object Storage API V1 Reference—API V1. <https://docs.huinoo.com/openstack/archive/api/openstack-object-storage/1.0/os-objectstorage-devguide-1.0.pdf>.2014. (Year: 2014).
Rivkind, Yael. Object Storage: Everything You Need To Know. <https://lakefs.io/blog/object-storage/>Nov. 25, 2020. (Year: 2020).
Sonobuoy Overview, https://sonobuoy.io/docs/v0.56.10/, Oct. 7, 2022.
"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.
"How to use Indexing to Improve Database Queries," https://dataschool.com/sql-optimization/how-indexing-works/, pp. 1-12.
"Method:disks.get|Compute Engine Documentation|Google Cloud.pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"PUT Object|Cloud Storage|Google Cloud," https://cloud.google.com/storage/docs/xml-api/put-object, pp. 1-3.
"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
Ballard, Brit, "Back to Basics: Writing SQL Queries," (Apr. 21, 2014), https://thoughtbot.com/blog/back-to-basics-sql, 1-17 pages.
Dellemc, "Elastic Cloud Storage (ECS)," (Aug. 2017), https://repository.usc.edu/sites/repository.usc.edu/files/ecs_overview.pdf. pages 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-Jul. 9, 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wambler, Choosing a Primary Key: Natural or Surrogate? http://www.agiledata.org/essays/keys.html, 2018, pp. 1-4 (2018).
Wikipedia, "Chunked transfer encoding," https://en.wikipedia.org/wiki/Chunked_transfer_encoding, pp. 1-4.
Woodward Liz, "What Is Elastic Cloud Storage—A Guide to ECS in 2022," https://www.cloudwards.net/what-is-elastic-cloud-storage/, pp. 1-8.

* cited by examiner

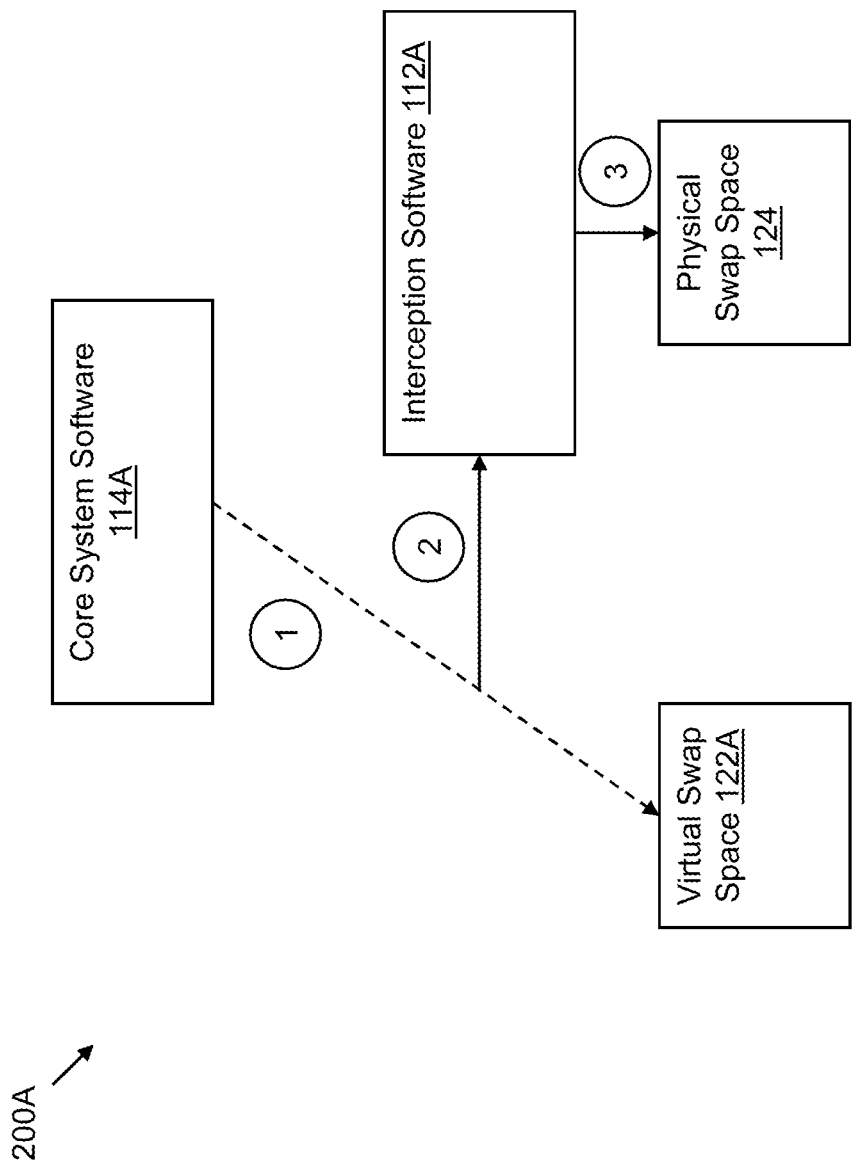

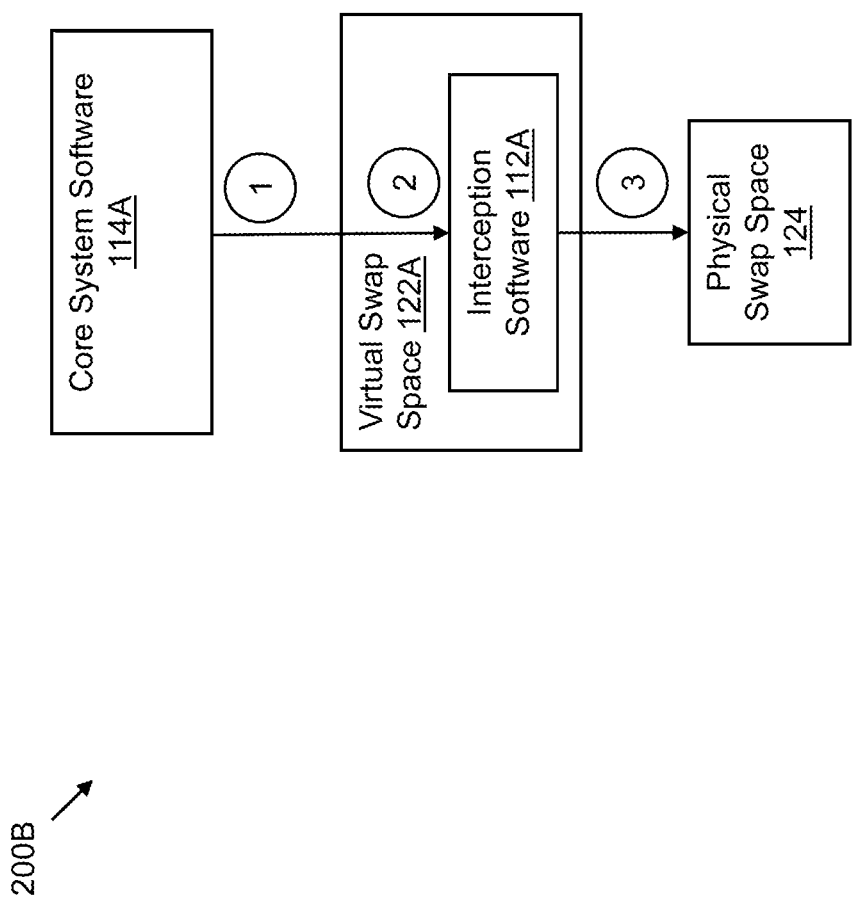

SYSTEMS AND METHODS FOR TRANSPARENT SWAP-SPACE VIRTUALIZATION

BACKGROUND

Hypervisors and operating systems may implement demand paging to support virtual memory. In some embodiments, virtual memory provides an illusion of more random-access memory (RAM) than is physically available.

SUMMARY

The disclosure relates generally to paging and, more particularly, to systems and methods for transparent swap-space virtualization.

In some aspects, a non-transitory computer readable storage medium includes instructions stored thereon that, when executed by a processor, cause the processor to create a virtual swap space that is exposed to a core system software, intercept a first page selected by the core system software to be swapped out to the virtual swap space, map the virtual swap space to a physical swap space that is allocated to a type of page associated with first swap metadata, and write the first page to the physical swap space based on the first page having the first swap metadata. In some embodiments, the first page is associated with the first swap metadata.

In some aspects, an apparatus includes a processor and a memory. In some embodiments, the memory includes programmed instructions that, when executed by the processor, cause the apparatus to create a virtual swap space that is exposed to a core system software, intercept a first page selected by the core system software to be swapped out to the virtual swap space, map the virtual swap space to a physical swap space that is allocated to a type of page associated with first swap metadata, and write the first page to the physical swap space based on the first page having the first swap metadata. In some embodiments, the first page is associated with first swap metadata.

In some aspects, a computer-implemented method by a processor includes creating a virtual swap space that is exposed to a core system software, intercepting a first page selected by the core system software to be swapped out to the virtual swap space, mapping the virtual swap space to a physical swap space that is allocated to a type of page associated with first swap metadata, and writing the first page to the physical swap space based on the first page having the first swap metadata. In some embodiments, the first page is associated with first swap metadata.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2A illustrates an example diagram of a system for swapping-out page content, in accordance with some embodiments.

FIG. 2B illustrates an example diagram of a system for swapping-out page content, in accordance with some embodiments.

Figure 1:
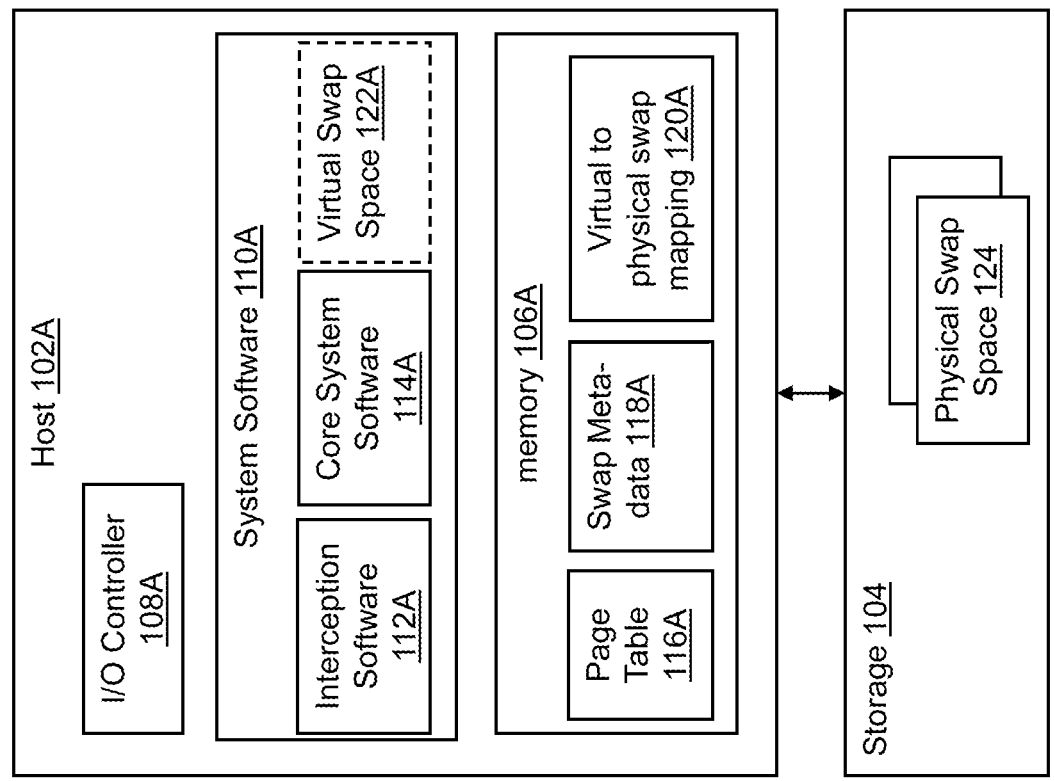
FIG. 1 illustrates a block diagram of a system for virtualizing a swap-space, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Hypervisors and operating systems may implement demand paging to support virtual memory. In some embodiments, virtual memory provides an illusion of more random-access memory (RAM) than is physically available. When memory is overcommitted, the operating system may reclaim pages resident in RAM, swapping out the contents of the RAM to a slower backing store (e.g., disk storage, local non-volatile memory (NVM), NVM accessed across a network, or remote RAM accessed across a network), from which the contents can later be read on demand if needed.

In some embodiments, an operating system (e.g., kernel, base kernel, host operating system) swaps memory into a common shared swap space associated with the physical host that the operating system manages. In some embodiments, swap locations in the common shared swap space are identified by (a) a type, which specifies a swap file number (e.g., a 5-bit index associated with one of 32 swap files) and (b) an offset, which specifies a page offset into the swap file (e.g., 50-bit offset for x86-64, 27-bit offset for x86-32). Pages from different entities such as virtual machines (VMs) and/or other non-VM processes running on the host may be mixed together in the same common swap space. In some embodiments, there is no support for using separate per-process or per-VM swap files or devices. Moreover, there may not be support for sharing the swap space across multiple hosts. In some embodiments, the swap space is associated with a single host and is managed exclusively by the operating system running on the host. A per-host swap space may be inefficient for live migration from a source host to a destination host. In some embodiments, any guest-physical pages which have been swapped to a disk on the source host are first swapped back into RAM in order to send contents of the guest-physical pages to the destination host. The contents of the guest-physical pages may induce additional swapping on the destination host.

What is desired is a system that supports flexible grouping of swapped pages into separate swap areas associated with each process, cgroup, or VM. It is also desirable to retain backwards compatibility with a standard (e.g., Linux kernel) swap subsystem, without any modifications to existing system software (e.g., core kernel) code, and without requiring existing system software recompilation.

Disclosed herein are embodiments of a new virtualization layer for swap space. The core system software-specified swap location (e.g., type, offset) can be treated as a virtual (logical) swap address. Using additional swap metadata that is available at the time a page is swapped out, such as its associated process, cgroup, or VM, the virtual location can be mapped to a physical swap location. This virtualization layer can be implemented by leveraging interception software to intercept all host swap activity, and redirect the host swap activity to one or more files or devices that are segregated based on the swap metadata. As a result, no I/O is performed to the virtual swap space exposed to the core system software.

Embodiments of the proposed approach have several advantages. In some embodiments, the system and method provide flexibility in deciding where to store swapped pages. For example, swapped pages can be partitioned into distinct files by process, cgroup, VM, or other properties. In some embodiments, the system and method do not require any modifications to core system software code and the system and method can be implemented by software that is added to the already compiled core system software at run-time.

FIG. 1 illustrates a block diagram of a system 100 for virtualizing a swap-space, in accordance with some embodiments. The system 100 includes a host (e.g., node, machine, computer) 102A and a storage 104 coupled to the host 102A. In some embodiments, the storage 104 includes a physical swap space 124, which may be one or more files or devices. In some embodiments, the host 102A includes system software (a bare-metal hypervisor, a hosted/kernel-based hypervisor, a host operating system such as Linux, a kernel, or a combination thereof) 110A. In some embodiments, the host 102A includes a host operating system separate from the system software 110A.

In some embodiments, the system software 110A includes a core system software (e.g., a base/core/built-in kernel, one or more base/core/built-in kernel modules/services/drivers/applications, etc.) 114A. In some embodiments, the core system software 114A is included in the system software 110A at boot-up and before the interception software 112A is compiled. In some embodiments, the core system software 114A may support loadable kernel modules which are loaded at run-time. In some embodiments, the system software 110A includes an interception software (e.g., service/module/driver/application) 112A which can virtualize swap-space of the host 102A. The interception software 112A may be inserted into the swap path to interpose on swapping activity. In some embodiments, the interception software 112A exposes a virtual swap space 122A to the core system software 114A while storing swapped (e.g., swapped-out) pages in the physical swap space 124 (e.g., FIG. 1 shows the virtual swap space 122A as being exposed in the system software 110A although it may be exposed as being anywhere in the host 102A). In some embodiments, the interception software 112A is a loadable kernel module (e.g., a kernel module that is dynamically loaded into system software 110A by core system software 114A). Details of the interception software 112A are described below in greater detail.

In some embodiments, the host 102A includes underlying hardware such as memory 106A, one or more physical disks, one or more input/output (I/O) devices, and one or more central processing units (CPUs). The memory 106A may store content (e.g., memory content, data) of non-swapped pages. The storage 104 (e.g., the physical swap space 124) may store content of swapped pages. In some embodiments, the memory 106A includes a page table 116A. In some embodiments, each page table entry (PTE) of the page table 116A that corresponds to a guest-physical page in the memory 106A (e.g., non-swapped guest-physical page) specifies a host-physical address (e.g., in the memory 106A) for the non-swapped guest-physical page. In some embodiments, each entry of the page table that corresponds to a guest-physical page in the storage 104 (e.g., a swapped guest-physical page) specifies a swap location (e.g., a location in the virtual swap space 122A).

In some embodiments, the memory 106A includes swap metadata 118A. In some embodiments, each entry of the swap metadata 118A corresponds to a page (e.g., host-physical page or a swapped page). In some embodiments, each entry of the swap metadata 118A includes metadata (e.g., metadata attributes) associated with/corresponding to/identifying the page. In some embodiments, each entry of the swap metadata 118A includes one or more of a Quick Emulator (QEMU) identifier of a QEMU associated with the page, a control group (cgroup) identifier of a cgroup associated with the page, a process identifier (PID) of a process associated with the page, or any group associated with the page. In some embodiments, each entry of the swap metadata 118A includes a VM identifier of a VM associated with the page. In some embodiments, the interception software 112A classifies each page based on its entry in the swap metadata 118A. In some embodiments, the interception software 112A segregates the physical swap space 124 into one or more files or devices. In some embodiments, each of the one or more files or devices is dedicated to one or more of the metadata attributes (e.g., each file or device is per-one or more metadata attributes such as per-cgroup).

In some embodiments, the memory 106A includes virtual-to-physical swap mapping (e.g., an in-memory virtual-to-physical mapping, a translation table, a virtual-to-physical translation table, etc.) 120A. In some embodiments, each entry of the virtual-to-physical swap mapping 120A indicates a virtual swap location (e.g., swap slot location, address) that corresponds/maps/translates to a physical swap location (e.g., swap slot location, address). In some embodiments, the virtual swap location is the location in the virtual swap space 122A that the core system software 114A selects to store (e.g., write) the contents of swapped pages. In some embodiments, the physical swap location is the location in the physical swap space 124 where the swapped page (e.g., content) is actually stored.

FIG. 2A illustrates an example diagram of a system 200A for swapping out page content, in accordance with some embodiments. In some embodiments of a swap-out operation, as shown in step 1 of FIG. 2A, the core system software 114A sends instructions to swap out page content from the memory 106A to the virtual swap space 122A that is exposed to the core system software 114A by the interception software 112A. In some embodiments, the core system software 114A invokes/calls the interception software 112A (e.g., an interception store handler such as the Linux frontswap interface registered by the interception software 112A), providing a virtual swap location (e.g., type, offset) and metadata attributes of the swap metadata 118A as arguments. Metadata attributes of the swap metadata 118A for classifying the page to be swapped, such as its associated process and cgroup, may be available via a struct page argument.

In some embodiments, at step 2 of FIG. 2A, the interception software 112A intercepts the page content selected to be swapped out. In some embodiments, the interception software 112A classifies the page based on the metadata attributes. In some embodiments, the interception software 112A allocates/finds/selects an appropriate physical swap location to store the page, such as an offset within a per-cgroup or per-VM file. In some embodiments, the interception software 112A adds an entry into the virtual-to-physical swap mapping 120A that maps from core system software 114A-specified (virtual) swap-slot location to the physical swap location.

In some embodiments, at step 3 of FIG. 2A, the interception software 112A stores the page content at the physical swap location of the physical swap space 124. In some embodiments, the interception software 112A performs the physical I/O write. In some embodiments, the interception software 112A sends instructions to an I/O controller 108A to perform a physical I/O write to persist the page content to the physical swap location and the I/O controller 108A performs or remotely initiates the physical I/O write. In some embodiments, the interception software 112A is a loadable kernel implementation of a frontswap backend for a Linux frontswap interface.

In some embodiments, on a swap-in operation using the system 200A, the core system software 114A invokes/calls the interception software 112A (e.g., the interception load handler such as the Linux frontswap interface), providing the virtual swap location, the memory allocated to hold the page contents, and metadata attributes as arguments. In some embodiments, the interception software 112A maps/translates the virtual swap location/address to its corresponding physical swap location/address in the virtual-to-physical swap mapping 120A. In some embodiments, the interception software 112A performs the physical I/O read. In some embodiments, the interception software 112A sends instructions to the I/O controller 108A to perform a physical I/O read to load the page contents from the physical swap location and the I/O controller 108A performs or remotely initiates the physical I/O read.

FIG. 2B illustrates an example diagram of a system 200B for swapping out page content, in accordance with some embodiments. In some embodiments of a swap-out operation, as shown in step 1 of FIG. 2B, the core system software 114A sends instructions to swap out page content from the memory 106A to the virtual swap space 122A that is exposed to the core system software 114A by the interception software 112A. In some embodiments, the I/O controller 108A performs the physical I/O write. In some embodiments, the interception software 112A effectively presents/exposes itself, to the core system software 114A, as a disk device that implements the virtual swap space 122A (in FIG. 2B, the interception software 112A is shown as being included in (e.g., implementing) the virtual swap space 122A even though it is separate).

In some embodiments, at step 2 of FIG. 2B, the interception software 112A receives the page content selected to be swapped out. In some embodiments, the interception software 112A classifies the page based on the metadata attributes. In some embodiments, the interception software 112A allocates an appropriate physical swap location to store the page. In some embodiments, the interception software 112A adds an entry into the virtual-to-physical swap mapping 120A. In some embodiments, at step 3 of FIG. 2A, the interception software 112A sends instructions to the I/O controller 108A to perform a physical I/O write. In some embodiments, the I/O controller 108A performs the physical I/O write. In some embodiments, the interception software 112A is a custom loadable module (referred to herein as "swap-mapper").

In some embodiments, on a swap-in operation using the system 200B, the interception software 112A translates the virtual swap location to its corresponding physical swap location/address in the virtual-to-physical swap mapping 120A. In some embodiments, the interception software 112A sends instructions to the I/O controller 108A to perform a physical I/O read to load the page contents from the physical swap location and the I/O controller 108A performs the physical I/O read.

In some embodiments, the interception software 112A exposes the virtual swap space 122A to the core system software 114A in order to specify the aggregate swap capacity, so that the core system software 114A can manage the allocation and deallocation of swap slots, maintain free-slot bitmaps, etc. In some embodiments, the virtual swap space 122A is not actually backed by any physical storage. In some embodiments, to avoid consuming disk space, the virtual swap space 122A is implemented as a special storage device such as, or similar to, /dev/zero that advertises a fixed capacity, but returns zero-filled pages on reads and ignores, or returns errors for, writes. In some embodiments, the virtual swap space 122A is implemented as a sparse file. In some embodiments, the virtual swap space 122A is implemented as thin-provisioned, distributed storage fabric-backed disks, which may consume almost no space. In some embodiments, the distributed storage fabric is an Acropolis distributed storage fabric (ADSF).

Figure 3:
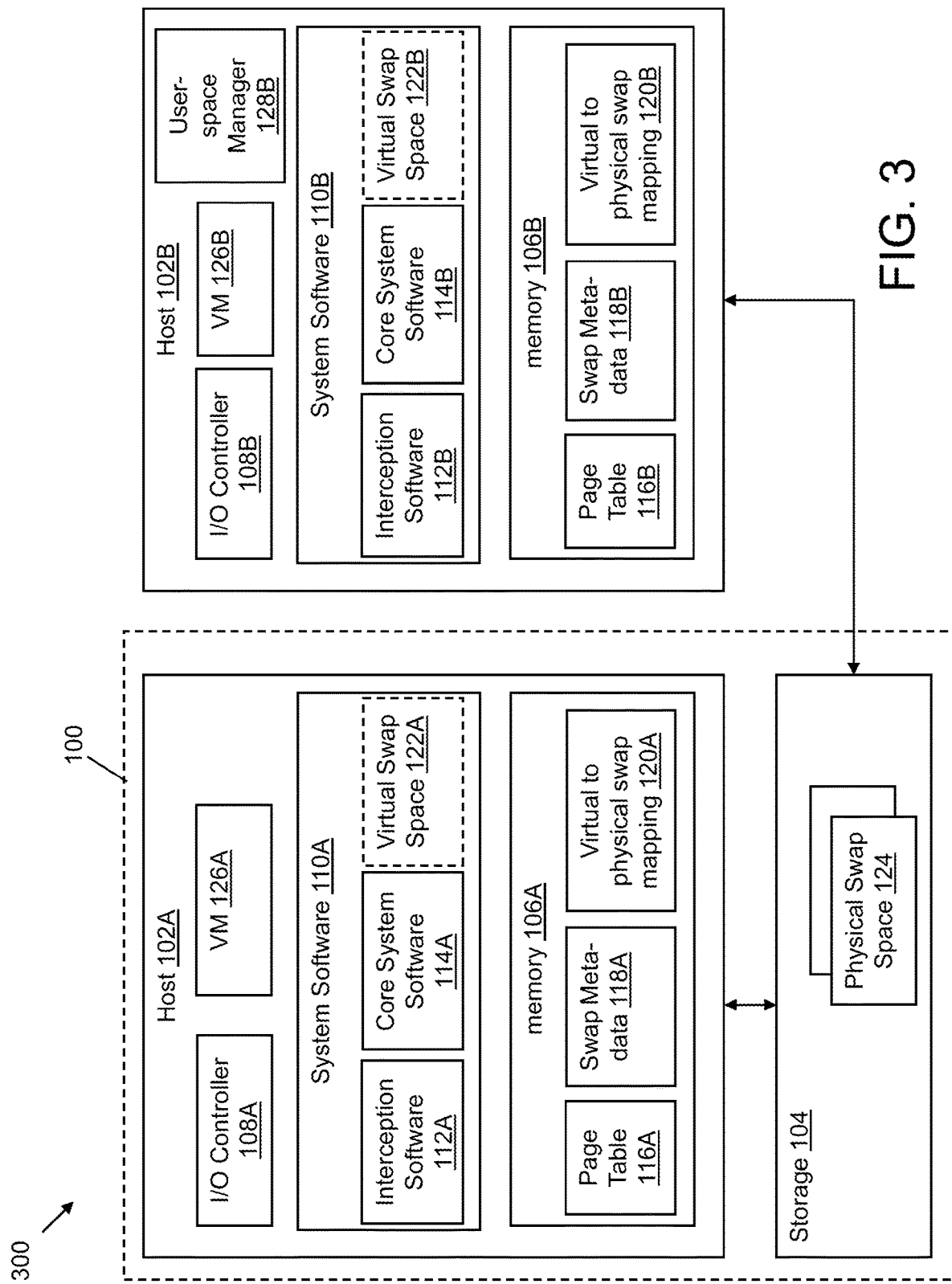
FIG. 3 illustrates a block diagram of a system for migrating a VM, in accordance with some embodiments.

FIG. 3 illustrates a block diagram of a system 300 for migrating a VM, in accordance with some embodiments. The system 300 includes the system 100. The system includes a (e.g., destination) host 102B coupled to the (e.g., source) host 102A and the storage 104. In some embodiments, the host 102B includes a system software 110B. In some embodiments, the system software 110B includes an interception software 112B and a core system software 114B. In some embodiments, the host 102B includes memory 106B. In some embodiments, the memory 106B includes a page table 116B, a swap metadata 118B, and a virtual-to-physical mapping 120B. In some embodiments, the host 102B includes an I/O controller 108B. In some embodiments, the interception software 112B exposes a virtual swap space 122B to the core system software 114B.

In some embodiments, before a VM live migration, the host 102A includes a VM 126A. In some embodiments, some memory pages for VM 126A are resident in memory 106A. In some embodiments, after the VM live migration, the VM 126A is suspended on the host 102A and resumes on the host 102B (referred to as VM 126B on the host 102B), and some memory pages for VM 126B are resident in memory 106B. In some embodiments, the destination host 102B includes a user-space manager 128B. In some embodiments, the host 102B and components therein (e.g., the system software 110B, etc.) are similar to the host 102A and components therein, respectively.

In some embodiments of a VM live migration, the pre-copy loop is modified to skip any already-swapped pages. The virtual-to-physical swap mapping 120A maintained by the interception software 112A can be used to identify which pages have been swapped. In some cases, whether or not a page has been swapped can be determined using information obtained from (a) a loadable module or (b) a pseudo-file interface provided by the kernel such as pagemap.

In some embodiments, the source host 102A sends the set of swap mappings from VM guest-physical page to physical swap location (e.g., a combination of the page table 116A, the virtual-to-physical swap mapping 120A) to the destination host 102B such as (a) by modifying user-space migration code to send the swap locations inline incrementally (in place of the actual page contents), or (b) by using an out-of-band method to send swap locations in a single batch after the pre-copy completes. In some embodiments, the source host 102A performs the out-of-band method to transfer other metadata associated with the VM 126A using a loadable module such as D-Bus VMstate to mimic a device associated with the VM 126A whose state is to be transferred when it is migrated. In some embodiments, the destination host 102B stores new contents in the page table 116B, wherein the new contents are derived from the page table 116A.

In some embodiments, after the pre-copy finishes, an application programming interface (API) in the core system software 114B, such as userfaultfd, on the destination host 102B handles demand/page/user faults for pages swapped-out on the source host 102A. In some embodiments, the destination host 102B consults the page table 116B to determine which pages have demand faults. In some embodiments, handling demand faults requires first registering the memory ranges in the memory 106B for which user faults are or can be generated. In some embodiments, a user-space manager 128B (e.g., a QEMU process) that is registered to receive the missing page notifications (e.g., generated by the core system software 114B) is notified about subsequent page faults for missing pages.

In some embodiments, the user-space manager 128B dynamically resolves a fault for a missing page that had been swapped on the source host 102A by first (e.g., fetching the physical swap location for the missing page identified in the missing page notification and) reading the page from the physical swap file, and then providing its contents to the core system software 114B, for example, using UFFDIO_COPY. In some embodiments, accesses to other missing pages that are unmapped (but were not previously swapped) are resolved, for example, using UFFDIO_ZEROPAGE.

In some embodiments, the destination host 102B registers a separate range for each RAM block of the memory 106A, optionally skipping those without any swapped pages. In some embodiments, only a single set of swap mappings is needed, independent of the number of times a VM 126A is migrated. In some embodiments, a user space program configured to receive and resolve missing page notifications, such as userfaultfd, is not used for running a VM 126A prior to its first live migration. In some embodiments, because the VM 126A has not previously run on any other host, none of its pages could have been swapped.

In some embodiments, a QEMU process on the destination host 102B ("destination QEMU," e.g., the user-space manager 128B), and the interception software 112B (e.g., implemented as the swap-mapper) can coordinate to remap the virtual swap space 122B to the physical swap space 124 without using userfaultfd. In some embodiments, the mapping is reestablished by leveraging an extra level of indirection introduced by mapping from virtual swap locations to physical swap locations. In some embodiments, the various components coordinate to update the virtual-to-physical mapping 120B and the page table 116B without the interception software 112B or the I/O controller 108B actually performing or remotely initiating any I/O.

In some embodiments, on each page to be migrated, a QEMU process on the source host 102A ("source QEMU") determines whether the page has been swapped out or not. In some embodiments, if the page has been swapped out, then the source QEMU does not load or send the contents of the page, but instead sends a zero-page message. In some embodiments, the destination QEMU (e.g., the user-space manager 128B) marks the swapped-out page not-present as if it was truly zero. In some embodiments, one or more files or devices of the physical swap space 124 (e.g., the cgroup's backing disk) is mounted at the destination host 102B. In some embodiments, non-swapped pages are migrated normally (e.g., during pre-copy) from source host 102A to 102B.

In some embodiments, the source QEMU queries the interception software 112A (e.g., via an ioctl system call) to find out the physical swap location for each virtual swap location. In some embodiments, a response to the query includes or results in virtual-memory to physical-swap mappings (e.g., the page table 116A, a combination of the virtual-to-physical swap mapping 120A), which is sent to the destination QEMU. In some embodiments, upon receiving these mappings, the destination QEMU notifies/provides indication to the interception software 112B of (future) mapping injections on these physical slots and starts pre-swapping to reconstruct the mappings. As used herein, pre-swapping includes that the destination QEMU writes the physical swap location into each swapped virtual memory page.

In some embodiments, pre-swapping means the destination QEMU writes the physical swap location into each swapped virtual memory page. In some embodiments, the destination QEMU writes a header/identifier (e.g., using a format of "Nutanix AHV: GPPN=% d, SWAP=% d offset=% d") as a way to communicate swap metadata (e.g., the physical swap location, the virtual swap location such as the type, offset, and GPPN (guest-physical page number, which can be associated with a host-virtual address in the destination QEMU) in the virtual swap space 122A or 122B) to the interception software 112B. In some embodiments, writing the physical swap location causes a new page (e.g., a zero-filled page) to be allocated as the pages were marked not present. In some embodiments, the destination QEMU forcibly swaps out these pages, for example, via madvise. In some embodiments, upon receiving these pages, the interception software 112B does not allocate a new slot (e.g., location) for each of the received pages, but instead inspects their contents to find the physical swap location that destination QEMU wrote. In some embodiments, the interception software 112B recreates that mapping (e.g., the virtual-to-physical mapping 120B) and deletes the (new) page from any in-memory page caches, such as the swap cache or buffer cache, preventing the bogus page contents from ever reaching the VM 126B.

In some embodiments, once the VM migration/transfer is complete and the source QEMU shuts down, the backing disk can be removed from the source host 102A. In some embodiments (e.g., such as some embodiments of pre-swap), since all of the necessary mappings have been re-created, post-migration swap on the destination host 102B occurs identically to pre-migration swap on the source host 102A and no user-space manager 128B is needed.

In some embodiments, implementing each of the interception software 112A and the interception software 112B as a swap-mapper only requires using a QEMU process on each host in addition to the swap-mapper (e.g., and not frontswap or userfaultfd). In some embodiments, in using swap-mapper, a VM that has been fully migrated to the destination host 102B is indistinguishable from one that started on the destination host 102B. In some embodiments, using the swap-mapper or core system software 114B implementations such as frontswap/userfaultfd avoids reading swapped data during migration (e.g., reading the page from a physical swap file of the physical swap space 124, and providing its contents to the core system software 114B).

Returning to FIG. 1, the system software 110A may virtualize the underlying resources (e.g., one or more of compute, storage, or network resources, resources of the host 102A, resources of the storage 104) for virtual machines. The system software 110A may offer a hyperconverged solution (e.g., wherein storage, compute, and network resources are tightly coupled and managed by a single management pane that may reside in, or communicate with, the system software 110A).

In some embodiments, the host 102A includes the input/output (I/O) controller 108A. In some embodiments, the I/O controller 108A provides one or more of the functions attributed to the interception software 112A. In some embodiments, the I/O controller 108A coordinates with the interception software 112A to perform I/O to the storage 104. In some embodiments, the I/O controller 108A communicates over the network to a remote storage server (e.g. via NFS protocol), and the remote storage server performs the physical I/O to a local disk that it manages. In some embodiments, the I/O controller 108A is a kernel or user-mode software/application.

The memory 106A may include, but is not limited to (a) temporary memory device such as RAM or (b) NVM (e.g., persistent memory) such as non-volatile dual in-line memory modules (NVDIMM), read only memory (ROM) device, any type of magnetic storage devices (e.g., hard disk, floppy disk, magnetic strips, etc.), optical disks (e.g., compact disk (CD), digital versatile disk (DVD), etc.), smart cards, solid state devices, etc.

The storage 104 may include, but is not limited to, NVM such as NVDIMM, storage devices, optical disks, smart cards, hard disk drives (HDD), solid state devices (SSD), etc. The storage 104 can be shared with one or more host machines such as the host 102A. The storage 104 can store data associated with the host 102A. The data can include file systems, databases, computer programs, applications, etc. The storage 104 can also include the swapped-out data from the memory 106A of the host 102A. In some embodiments, the storage 104 may include swapped-out memory data from the host 102A and metadata that includes information regarding the locations of the swapped-out memory data on the storage 104. In some such embodiments, the storage 104 can be partition of a larger storage device or pool. In some embodiments, the storage 104 is accessible via a storage area network (SAN) or a network-attached-storage (NAS) such as Networked File System (NFS), or Common Internet File System (CIFS).

In some embodiments, each of the entities (e.g., the interception software/userfaultfd/swap-mapper 112A, the interception software/userfaultfd/swap-mapper 112B, the source QEMU, the destination QEMU, etc.) is a processor, a specific-purpose processor, a driver, a module, or any entity that is built/configured/arranged to perform specific tasks.

Figure 4:
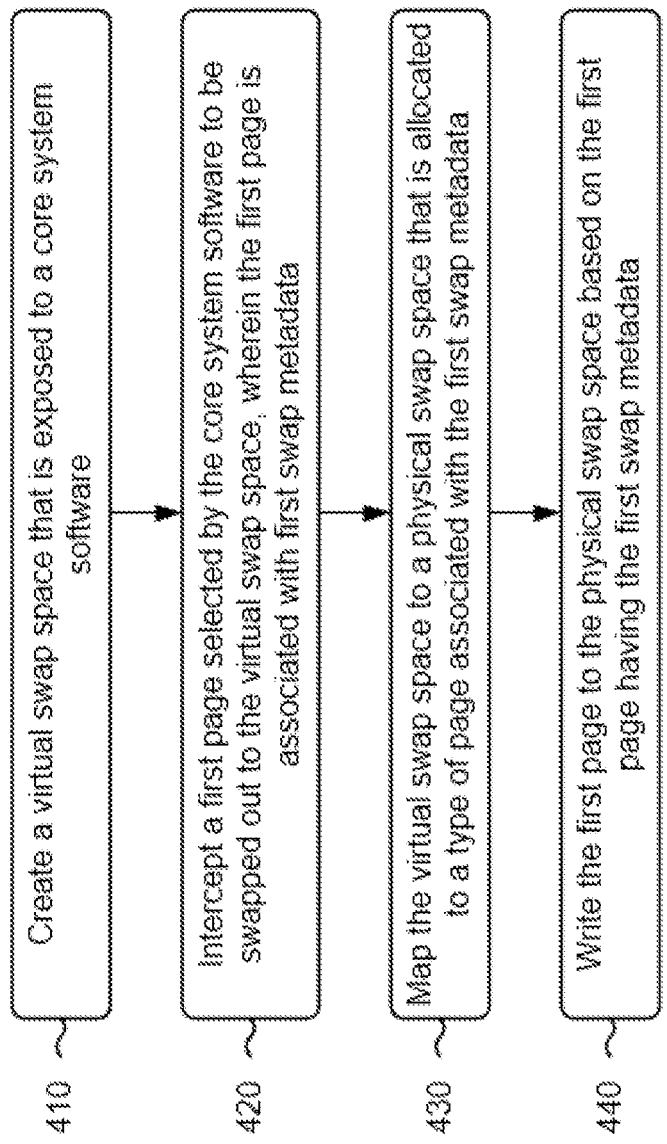
FIG. 4 illustrates a flowchart of an example method for virtualizing a swap space for a swap-out path, in accordance with some embodiments of the present disclosure.

Referring now to FIG. 4, a flowchart of an example method 400 for virtualizing a swap space for a swap-out path is illustrated, in accordance with some embodiments of the present disclosure. The method 400 may be implemented using, or performed by, one or more of the systems (e.g., one of the systems 100, 200A, 200B, or 300), one or more components (e.g., the host 102A, the host 102B, the system software 110A, the system software 110B, the interception software 112A, the interception software 112B, etc.) of one or more of the systems, a processor associated with one or more of the systems, or a processor of the one or more components of the one or more of the systems. Additional, fewer, or different operations may be performed in the method 400 depending on the embodiment. Additionally, or alternatively, two or more of the blocks of the method 400 may be performed in parallel.

In some embodiments, a processor (e.g., the interception software 112A or 112B) creates a virtual swap space (e.g., virtual swap space 122A or 122B) that is exposed to a core system software such as the core system software 114A or 114B (operation 410). In some embodiments, the processor intercepts a first page selected by the core system software to be swapped out to the virtual swap space (operation 420). In some embodiments, the first page is associated with first swap metadata. In some embodiments, the processor maps the virtual swap space to a physical swap space (e.g., physical swap space 124) that is allocated to a type of page associated with first swap metadata (operation 430). In some embodiments, the processor writes the first page to the physical swap space based on the first page having the first swap metadata (operation 440). In some embodiments, the processor incrementally generates a mapping from the virtual swap space to the physical swap space.

In some aspects, the first swap metadata includes one or more of a Quick Emulator (QEMU) identifier, a control group (cgroup) identifier, a process identifier, an associated group, or an associated user. In some aspects, the processor intercepts the first page selected by the core system software to be swapped in from the virtual swap space; and reads the first page from the physical swap space that is indicated by mapping the virtual swap space to the physical swap space.

In some aspects, the processor sends, to a destination host, a map (e.g., a set of mappings) from a virtual machine (VM) guest-physical page set to the physical swap space, wherein the VM guest-physical page set includes the first page, wherein the destination host is notified that the first page is swapped out to the physical swap space, and wherein the destination host reads the first page from the physical swap space. In some aspects, the processor sends, to a destination host, the mapping from the VM guest-physical page set to the physical swap space by sending a swap location of the first page inline with the actual page content of non-swapped pages of the VM guest-physical page set.

In some aspects, the processor creates the virtual swap space by one or more of (a) creating a storage device that returns zero-filled pages on reads, (b) creating a sparse file, (c) creating a thin-provisioned, distributed storage fabric-backed disk, or (d) creating a custom storage device that includes the interception software 112A or 112B. In some aspects, the processor determines a physical swap location in the physical swap space for writing a page when it is swapped out using a data structure that indicates whether the physical swap location is available.

Figure 5:
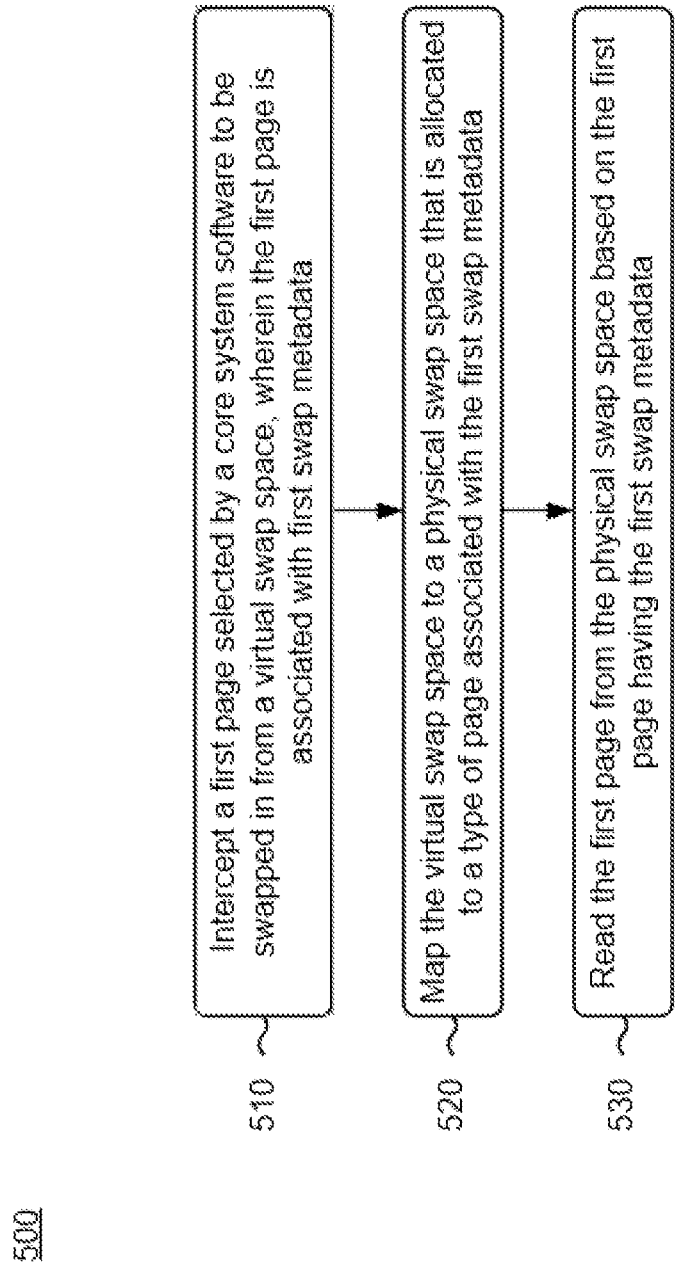
FIG. 5 illustrates a flowchart of an example method for virtualizing a swap space for a swap-in path, in accordance with some embodiments of the present disclosure.

Referring now to FIG. 5, a flowchart of an example method 500 for virtualizing a swap space for a swap-in path is illustrated, in accordance with some embodiments of the present disclosure. The method 500 may be implemented using, or performed by, one or more of the systems (e.g., one of the systems 100, 200A, 200B, or 300), one or more components (e.g., the host 102A, the host 102B, the system software 110A, the system software 110B, the interception software 112A, the interception software 112B, etc.) of one or more of the systems, a processor associated with one or more of the systems, or a processor of the one or more components of the one or more of the systems. Additional, fewer, or different operations may be performed in the method 500 depending on the embodiment. Additionally, or alternatively, two or more of the blocks of the method 500 may be performed in parallel. One or more steps of the method 500 can be combined with one or more steps of the method 400.

In some embodiments, the processor intercepts a first page selected by a core system software (e.g., the core system software 114A or 114B) to be swapped in from a virtual swap space such as the virtual swap space 122A or 122B (operation 510). In some embodiments, the first page is associated with first swap metadata. In some embodiments, the processor maps the virtual swap space to a physical swap space that is allocated to a type of page associated with first swap metadata (operation 520). In some embodiments, the processor reads the first page from the physical swap space based on the first page having the first swap metadata (operation 530).

Figure 6:
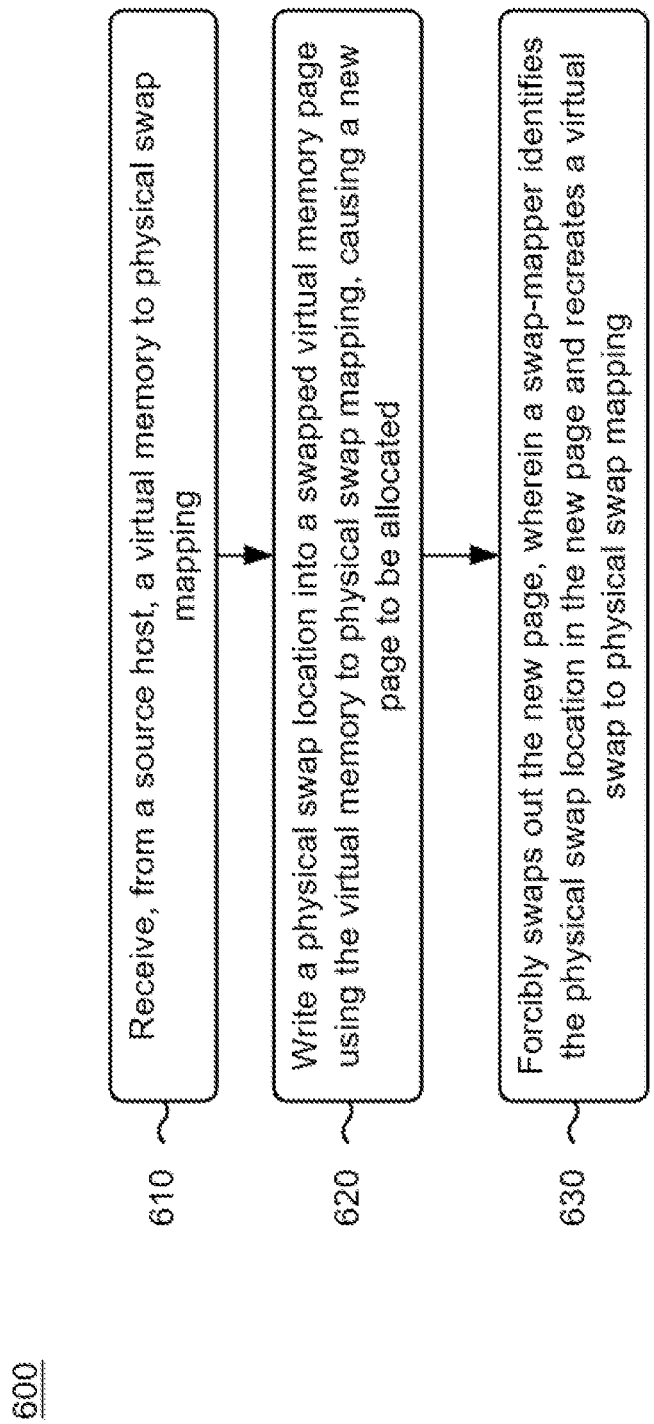
FIG. 6 illustrates a flowchart of an example method for migrating a VM, in accordance with some embodiments of the present disclosure.

Referring now to FIG. 6, a flowchart of an example method 600 for migrating a VM is illustrated, in accordance with some embodiments of the present disclosure. The method 600 may be implemented using, or performed by, one or more of the systems (e.g., one of the systems 100, 200A, 200B, or 300), one or more components (e.g., the host 102A, the host 102B, the system software 110A, the system software 110B, the interception software 112A, the interception software 112B, a QEMU process, etc.) of one or more of the systems, a processor associated with one or more of the systems, or a processor of the one or more components of the one or more of the systems. Additional, fewer, or different operations may be performed in the method 600 depending on the embodiment. Additionally, or alternatively, two or more of the blocks of the method 600 may be performed in parallel. One or more steps of the method 600 can be combined with one or more steps of one or more of the method 400 or the method 500.

In some implementations, a processor (e.g., a QEMU process on the destination host 102B) receives, from a source host, a virtual memory to physical swap mapping (operation 610). In some implementations, the processor writes a physical swap location into a swapped virtual memory page using the virtual memory-to-physical swap mapping, causing a new page to be allocated (operation 620). In some implementations, the processor forcibly swaps out (e.g., via madvise) the new page (operation 630). In some embodiments, a swap-mapper (e.g., on the destination host 102B) identifies the physical swap location in the new page and recreates a virtual-to-physical swap mapping.

Figure 7:
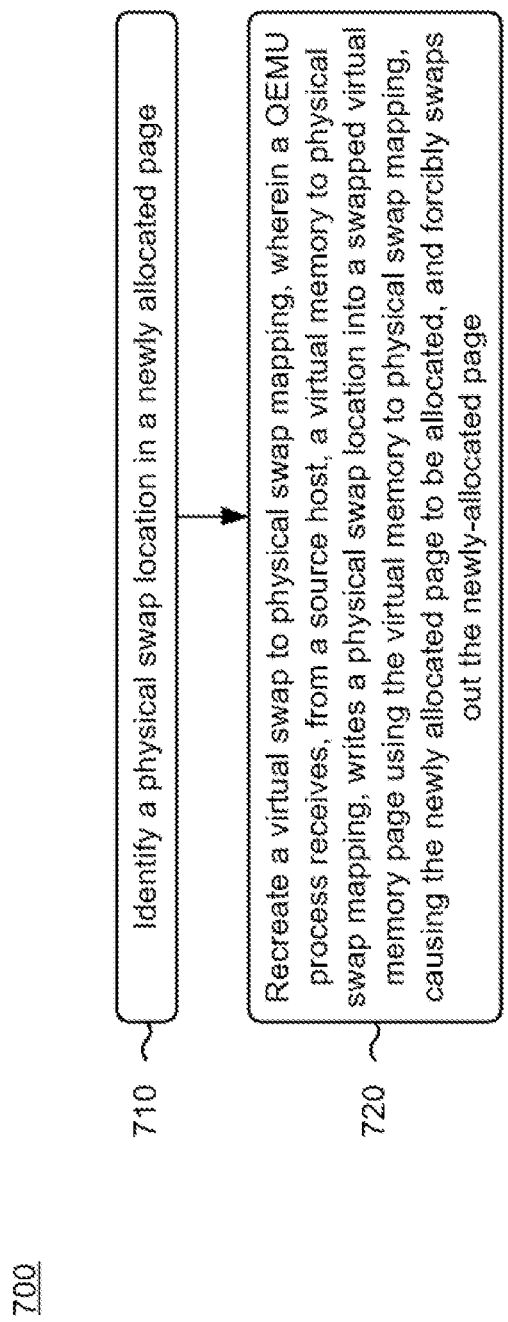
FIG. 7 illustrates another flowchart of an example method for migrating a VM, in accordance with some embodiments of the present disclosure.

Referring now to FIG. 7, a flowchart of an example method 700 for migrating a VM is illustrated, in accordance with some embodiments of the present disclosure. The method 700 may be implemented using, or performed by, one or more of the systems (e.g., one of the systems 100, 200A, 200B, or 300), one or more components (e.g., the host 102A, the host 102B, the system software 110A, the system software 110B, the interception software 112A, the interception software 112B, a swap-mapper, etc.) of one or more of the systems, a processor associated with one or more of the systems, or a processor of the one or more components of the one or more of the systems. Additional, fewer, or different operations may be performed in the method 700 depending on the embodiment. Additionally, or alternatively, two or more of the blocks of the method 700 may be performed in parallel. One or more steps of the method 700 can be combined with one or more steps of the methods 400-600.

In some implementations, a processor (e.g., a swap-mapper on the destination host 102B) identifies a physical swap location in a newly allocated page (operation 710). In some implementations, the processor recreates a virtual-to-physical swap mapping (operation 720). In some embodiments, a QEMU process (e.g., on the destination host 102B) receives, from a source host, a virtual memory-to-physical swap mapping, writes a physical swap location into a swapped virtual memory page using the virtual memory-to-physical swap mapping, causing the newly allocated page to be allocated, and forcibly swaps out (e.g., via madvise) the newly-allocated page.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable storage medium comprising instructions stored thereon that, when executed by a processor, cause the processor to:
   create a virtual swap space that is exposed to a host hypervisor software;
   intercept a first page selected by the host hypervisor software to be swapped out to the virtual swap space, wherein the first page is associated with first swap metadata;
   map the virtual swap space to a physical swap space that is allocated to a type of page associated with the first swap metadata;
   write the first page to the physical swap space based on the first page having the first swap metadata; and
   send, to a destination host, a map from a virtual machine (VM) guest-physical page set to the physical swap space, wherein the VM guest-physical page set includes the first page and a non-swapped out page, wherein the destination host is notified that the first page is swapped out to the physical swap space, and wherein the first page is readable from the physical swap space by the destination host.

2. The medium of claim 1, wherein the first swap metadata includes one or more of a Quick Emulator (QEMU) identifier, a control group (cgroup) identifier, a process identifier, an associated group, or an associated user.

3. The medium of claim 1, comprising instructions stored thereon that, when executed by a processor, further cause the processor to:
   intercept the first page selected by the host hypervisor software to be swapped in from the virtual swap space; and
   read the first page from the physical swap space that is indicated by mapping the virtual swap space to the physical swap space.

4. The medium of claim 1, comprising instructions stored thereon that, when executed by a processor, further cause the processor to incrementally generate a mapping from the virtual swap space to the physical swap space.

5. The medium of claim 1, comprising instructions stored thereon that, when executed by a processor, further cause the processor to send, to a destination host, the mapping from the VM guest-physical page set to the physical swap space by sending a swap location of the first page inline with the actual page content of the non-swapped out page of the VM guest-physical page set.

6. The medium of claim 1, comprising instructions stored thereon that, when executed by a processor, further cause the processor to create the virtual swap space by one or more of (a) creating a storage device that returns zero-filled pages on reads, (b) creating a sparse file, (c) creating a thin-provisioned, distributed storage fabric-backed disk, or (d) creating a custom storage device that includes an interception software.

7. The medium of claim 1, comprising instructions stored thereon that, when executed by a processor, further cause the processor to determine a physical swap location in the physical swap space for writing a page when it is swapped out using a data structure that indicates whether the physical swap location is available.

8. An apparatus comprising a processor and a memory, wherein the memory includes programmed instructions that, when executed by the processor, cause the apparatus to:
   create a virtual swap space that is exposed to a host hypervisor software;
   intercept a first page selected by the host hypervisor software to be swapped out to the virtual swap space, wherein the first page is associated with first swap metadata;
   map the virtual swap space to a physical swap space that is allocated to a type of page associated with the first swap metadata;

write the first page to the physical swap space based on the first page having the first swap metadata; and send, to a destination host, a map from a virtual machine (VM) guest-physical page set to the physical swap space, wherein the VM guest-physical page set includes the first page and a non-swapped out page, wherein the destination host is notified that the first page is swapped out to the physical swap space, and wherein the first page is readable from the physical swap space by the destination host.

9. The apparatus of claim 8, wherein the first swap metadata includes one or more of a Quick Emulator (QEMU) identifier, a control group (cgroup) identifier, a process identifier, an associated group, or an associated user.

10. The apparatus of claim 8, wherein the memory further includes programmed instructions that, when executed by the processor, cause the apparatus to:

intercept the first page selected by the host hypervisor software to be swapped in from the virtual swap space; and read the first page from the physical swap space that is indicated by mapping the virtual swap space to the physical swap space.

11. The apparatus of claim 8, wherein the memory further includes programmed instructions that, when executed by the processor, cause the apparatus to create the virtual swap space by one or more of (a) creating a storage device that returns zero-filled pages on reads, (b) creating a sparse file, (c) creating a thin-provisioned, distributed storage fabric-backed disk, or (d) creating a custom storage device that includes an interception software.

12. The apparatus of claim 8, wherein the memory further includes programmed instructions that, when executed by the processor, cause the apparatus to determine a physical swap location in the physical swap space for writing a page when it is swapped out using a data structure that indicates whether the physical swap location is available.

13. A computer-implemented method comprising:

creating, by a processor, a virtual swap space that is exposed to a host hypervisor software;

intercepting, by the processor, a first page selected by the host hypervisor software to be swapped out to the virtual swap space, wherein the first page is associated with first swap metadata;

mapping, by the processor, the virtual swap space to a physical swap space that is allocated to a type of page associated with the first swap metadata;

writing, by the processor, the first page to the physical swap space based on the first page having the first swap metadata; and sending, to a destination host, a map from a virtual machine (VM) guest-physical page set to the physical swap space, wherein the VM guest-physical page set includes the first page and a non-swapped out page, wherein the destination host is notified that the first page is swapped out to the physical swap space, and wherein the first page is readable from the physical swap space by the destination host.

14. The method of claim 13, wherein the first swap metadata includes one or more of a Quick Emulator (QEMU) identifier, a control group (cgroup) identifier, a process identifier, an associated group, or an associated user.

15. The method of claim 13, further comprising:

intercepting the first page selected by the host hypervisor software to be swapped in from the virtual swap space; and reading the first page from the physical swap space that is indicated by mapping the virtual swap space to the physical swap space.

16. The method of claim 13, further comprising creating the virtual swap space by one or more of (a) creating a storage device that returns zero-filled pages on reads, (b) creating a sparse file, (c) creating a thin-provisioned, distributed storage fabric-backed disk, or (d) creating a custom storage device that includes an interception software.

17. The method of claim 13, further comprising determining a physical swap location in the physical swap space for writing a page when it is swapped out using a data structure that indicates whether the physical swap location is available.

* * * * *